United States Patent [19]
Kamin et al.

[11] Patent Number: 5,398,520
[45] Date of Patent: Mar. 21, 1995

[54] ENHANCED COOLING ICE CHEST

[76] Inventors: Sam Kamin, 6500 Sandspoint #513, Houston, Tex. 77074; George Spector, 233 Broadway Rm 702, New York, N.Y. 10279

[21] Appl. No.: 187,871

[22] Filed: Jan. 28, 1994

[51] Int. Cl.[6] ............................................. F25D 17/02
[52] U.S. Cl. ........................................ 62/376; 62/371; 62/457.2; 62/235.1
[58] Field of Search .................. 62/371, 372, 373, 376, 62/457.1, 457.2, 475.9, 332, 235.1

[56] References Cited
U.S. PATENT DOCUMENTS 1,640,252  8/1927  Rizer ........................................ 62/376
2,909,040 10/1959  Newell ...................................... 62/376

*Primary Examiner*—John M. Sollecito

[57] ABSTRACT

An enhanced cooling ice chest is provided which consists of an insulated container having bottom, front, back and side interconnecting walls. A hinged lid is on the top of the insulated container, so that the insulated container can receive and hold a supply of ice and fish therein for cooling. An apparatus is for evenly distributing cold water from the melting ice onto the fish that are on the ice, so as to keep the fish completely cold within the container.

1 Claim, 2 Drawing Sheets

1

ENHANCED COOLING ICE CHEST

BACKGROUND OF THE INVENTION

The instant invention relates generally to cooling devices and more specifically it relates to an enhanced cooling ice chest, which provides a mechanism therein to keep fish completely cold within the chest.

There are available various conventional cooling devices which do not provide the novel improvements of the invention herein disclosed.

SUMMARY OF THE INVENTION

A primary object of the present invention is to provide an enhanced cooling ice chest that will overcome the shortcomings of the prior art devices.

Another object is to provide an enhanced cooling ice chest that will evenly distribute cold water from melting ice within the chest onto fish that are on the ice, so as to keep the fish completely cold within the chest.

An additional object is to provide an enhanced cooling ice chest in which a water pump built into the chest will spray the cold water up onto the fish, to evenly distribute the cold water within the chest.

A further object is to provide an enhanced cooling ice chest that is simple and easy to use.

A still further object is to provide an enhanced cooling ice chest that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
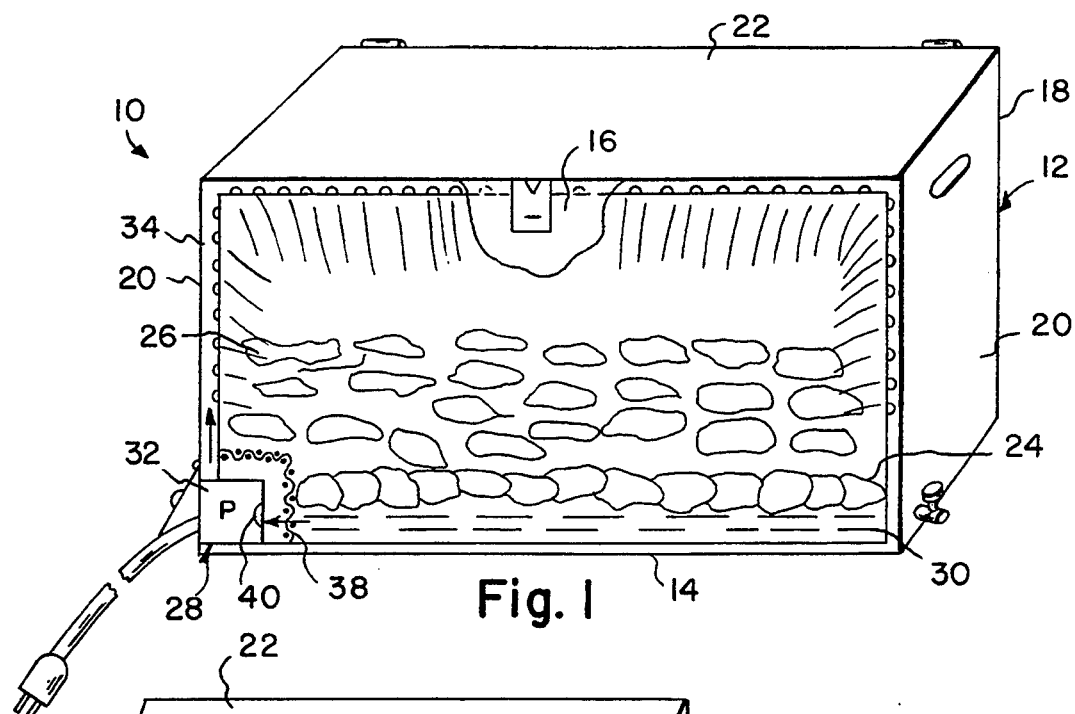
FIG. 1 is a diagrammatic perspective view partly in cross section of a first embodiment of the instant invention.

Turning now descriptively to the drawings, in which similar reference characters denote similar elements throughout the several views, FIGS. 1 through 6 illustrate an enhanced cooling ice chest 10, which consists of an insulated container 12, having bottom 14, front 16, back 18 and side 20 interconnecting walls. A hinged lid 22 is on the top of the insulated container 12, so that the insulated container 12 can receive and hold a supply of ice 24 and fish 26 therein for cooling. An apparatus 28 is for evenly distributing cold water 30 from the melting ice 24 onto the fish 26 that are on the ice 24, so as to keep the fish 26 completely cold within the container 12.

The cold water distributing apparatus 28 includes a water pump 32 built onto the bottom wall 14 of the container 12. an elongated spray tube 34 extends upwardly from the water pump 32, so as to carry and spray the cold water 30 onto the fish 26.

A filter plate 36 can be placed between the ice 24 and fish 26 within the insulated container 12, so as to separate the fish 26 from the ice 24, while allowing the cold water 30 sprayed onto the fish 26 to drip down towards the bottom wall 14.

Figure 2:
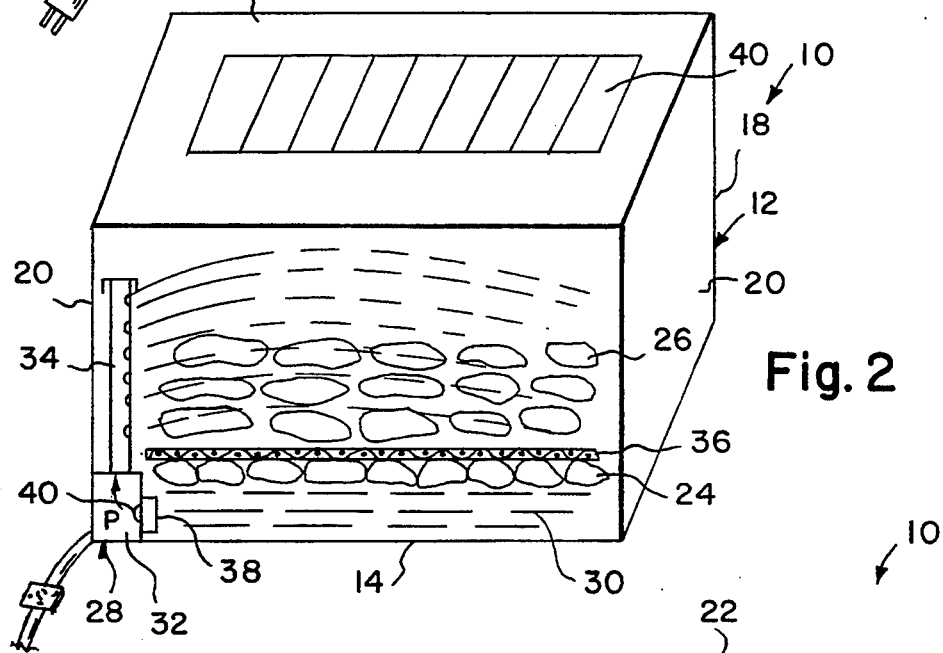
FIG. 2 is a diagrammatic perspective view partly in cross section of a second embodiment.
Figure 3:
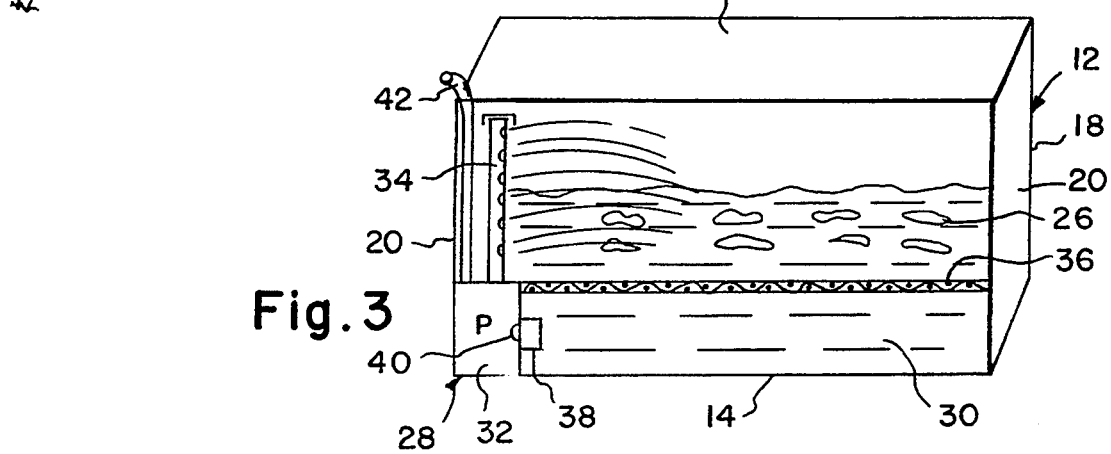
FIG. 3 is a diagrammatic perspective view partly in cross section of a third embodiment.
Figure 4:
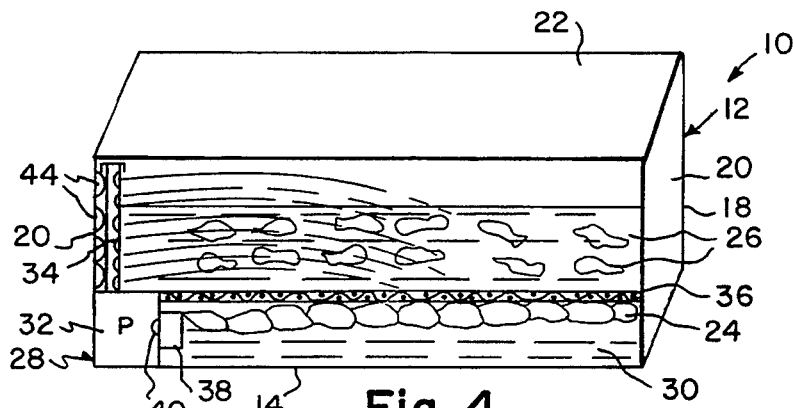
FIG. 4 is a diagrammatic perspective view partly in cross section of a fourth embodiment.
Figure 5:
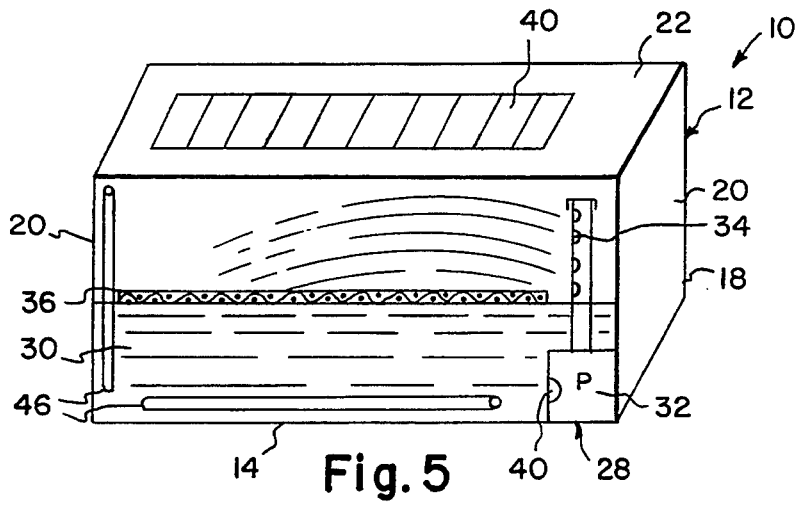
FIG. 5 is a diagrammatic perspective view partly in cross section of a fifth embodiment.

An intake filter 38 can be located at an inlet port 40 of the water pump 32. A solar panel 40, as shown in FIGS. 2 and 5, can be on the lid 22 to supply additional power to the water pump 32. An air intake hose 42, shown in FIG. 3, can be connected to the water pump 32 and extend outwardly under the closed lid 22 for aeration. A plurality of suction cups 44 in Figure are on the spray tube 34, so as to secure the spray tube 34 to one side wall 20 of the insulated container 12. A plurality of cold evaporator coils 46 in FIG. 5, are placed within the insulated container 12 to function as an electric refrigerator.

Figure 6:
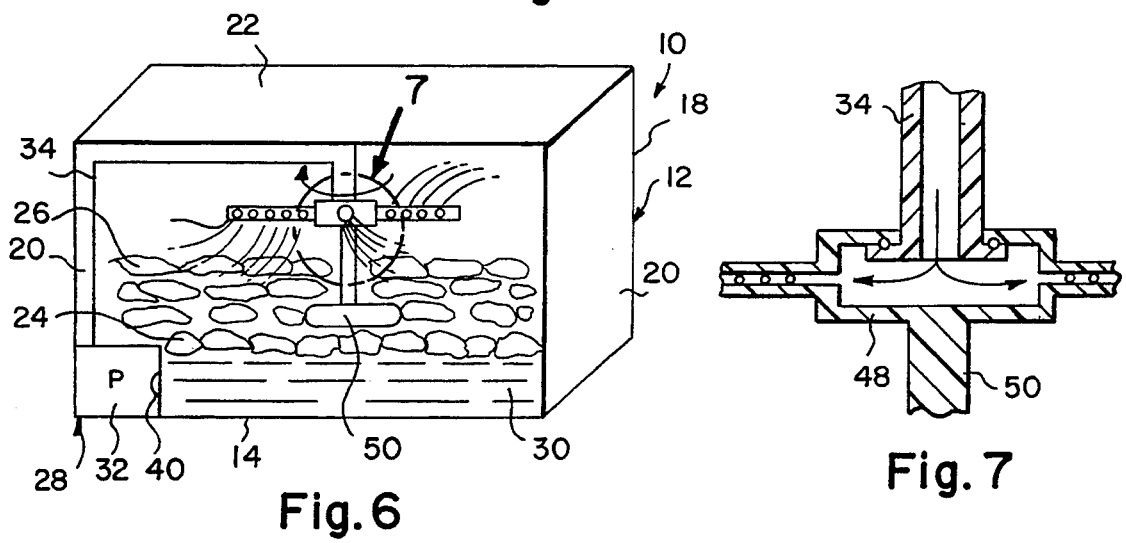
FIG. 6 is a diagrammatic perspective view partly in cross section of a sixth embodiment, having a propeller spray and agitator.
Figure 7:
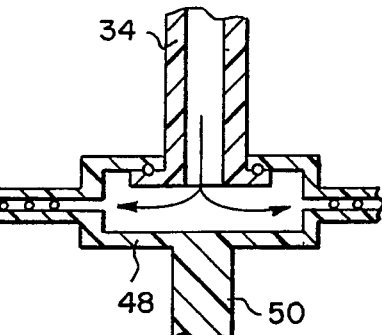
FIG. 7 is an enlarged cross sectional view of the area indicated by arrow 7 in FIG. 6, showing the propeller spray mechanism in greater detail.

As shown in FIGS. 6 and 7, a propeller spray 48 having an agitator 50 is suspended from the center of the insulated container 12 and is connected to the spray tube 34. The agitator 50 will extend into the fish 26, to mix the fish, while the propeller spray 48 will better distribute the cold water 30 onto the fish 26.

The power source for the water pump 32 can originate from any source. The filter plate 36 can be made of washable material. A closure cap can be built into the filter plate 36. It can be removed, to provide an opening for the spray tube 34 on some present water pumps 32. The enhanced cooling ice chest 10 can be placed or constructed into pleasure fishing boats and commercial fishing boats, to enhance the freshness of their catch or bait. It is especially useful in warm waters, where freshness is vital.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An enhanced cooling ice chest which comprises:
   a) an insulated container having bottom, front, back and side interconnecting walls;
   b) a hinged lid on the top of said insulated container so that said insulated container can receive and hold a supply of ice and fish therein for cooling;
   c) means for evenly distributing cold water from the melting ice onto the fish that are on the ice so as to keep the fish completely cold within said container; wherein said cold water distributing means includes:
   d) a water pump built onto the bottom wall of said container;
   e) an elongated spray tube extending upwardly from said water pump so as to carry and spray the cold water onto the fish, further including a filter plate placed between the ice and fish within said insulated container so as to separate the fish from the ice, while allowing the cold water sprayed onto the fish to drip down towards the bottom wall, further including f) an intake filter located at an inlet port of said water pump;

g) a solar panel on said lid to supply additional power to said water pump;

h) an air intake hose connected to said water pump and extending outwardly under said closed lid for aeration;

i) a plurality of suction cups on said spray tube so as to secure said spray tube to one side wall of said insulated container;

j) a plurality of cold evaporator coils placed within said insulated container, to function as an electric refrigerator; and k) a propeller spray having an agitator suspended from the center of said insulated container and connected to said spray tube whereby said agitator will extend into the fish to mix the fish while said propeller spray will better distribute the cold water onto the fish.

* * * * *